United States Patent
Kaario (12) 
(10) Patent No.: US 6,823,171 B1
(45) Date of Patent: Nov. 23, 2004

(54) GARMENT HAVING WIRELESS LOOPSET INTEGRATED THEREIN FOR PERSON WITH HEARING DEVICE

(75) Inventor: Juha Kaario, Tampere (FI)

(73) Assignee: Nokia Corporation, Espoo (FI)

( * ) Notice: Subject to any disclaimer, the term of this patent is extended or adjusted under 35 U.S.C. 154(b) by 531 days.

(21) Appl. No.: 09/803,029

(22) Filed: Mar. 12, 2001

(51) Int. Cl.[7] ................................................ H04B 5/00
(52) U.S. Cl. ...................................... 455/41.1; 381/331
(58) Field of Search ............................... 455/41.1, 66.1, 455/90.3, 344, 347, 349, 351, 557; 340/854.8; 381/331; 379/52

(56) References Cited

U.S. PATENT DOCUMENTS

| | | | |
|---|---|---|---|
| 5,793,875 A | * | 8/1998 | Lehr et al. .................. 381/313 |
| 6,208,740 B1 | * | 3/2001 | Grever .......................... 381/79 |
| 6,603,860 B1 | * | 8/2003 | Taenzer et al. ............... 381/60 |
| 2002/0084990 A1 | * | 7/2002 | Peterson ...................... 345/169 |

* cited by examiner

Primary Examiner—Lee Nguyen
Assistant Examiner—Sanh Phu
(74) Attorney, Agent, or Firm—Antonelli, Terry, Stout & Kraus, LLP

(57) ABSTRACT

An article of functional clothing comprises a garment; electrically conductive fibers integrated into the garment in a predetermined pattern to form an induction loop around the garment; and an activator unit arranged at a predetermined location on the induction loop to establish electrical connection and thus activate the induction loop, and to provide an interface to at least one portable electronic device.

31 Claims, 7 Drawing Sheets

GARMENT HAVING WIRELESS LOOPSET INTEGRATED THEREIN FOR PERSON WITH HEARING DEVICE

BACKGROUND OF THE INVENTION

1. Technical Field

The present invention relates to hearing devices (e.g., hearing aids, headsets and hands-free arrangements) and especially-made garments, and more particularly, relates to garments having wireless loopsets integrated therein for enabling persons with hearing devices to conveniently use portable electronic devices more efficiently with reduced radio interference.

2. Related Art

Clothes have always been to some extent a form of art and design, combining both color and functionality. Color is typically given to fabric, and to the resulting clothes, by dying the textile fibers. Functionality of clothes is often limited to the design and the inclusion of various materials, and elements, such as pockets or the like. For the most part, modern clothing typically includes pockets, belt loops, buttons and buttonholes, snaps, etc., and other design elements that increase its functionality.

Generally, the average person will wear a plurality of clothing articles or garments on a daily basis to which will be attached or placed in a pocket of the clothing, portable electronic devices, such as mobile phones, pagers, personal digital assistants (PDA), tape cassette players, compact disc (CD) players, MD players, DAT players, televisions, radios, clock/alarms, or some other similar mobile devices. The problem is that it is often difficult and unwieldy for people to carry various electronic devices such as mobile phones, pagers and other devices.

Smart clothing describes combining clothing with portable electronic devices. Specifically, portable electronic devices and computer technology have been incorporated into garments, such as jackets, vests, shirts or pants, so as to allow a user to better communication with others and to sense surroundings while minimizing the size of any additional portable electronic devices that the user typically carries. For example, U.S. Pat. No. 5,912,653 issued to Fitch, discloses the use of a programmable video display as incorporated into a garment such as a jacket for purposes of individual expression. U.S. Pat. No. 5,825,327 issued to Krasner, discloses the use of a GPS receiver and GPS antennas as incorporated into a garment such as a shirt or a pant for purposes of tracking the current location of the garment.

For most parts, smart clothing has been able to offer many users the added functionality of portable electronic devices. However, for people who have hearing problems and there are more 30 million hearing impaired persons in the United States alone, smart clothing has not made any in-road. Standard hearing aids may allow hearing impaired persons to listen better and communicate with others. A typical hearing aid contains an earpiece microphone, a speaker and associated processor electronics arranged to convert acoustic waves into electrical representations for amplification and subsequent conversion back into acoustic waves by the earpiece speaker to aid the hearing impaired persons. Most hearing aids feature an electromagnetic pickup coil, known as a "tele-coil" or "T-coil" used to pick-up electromagnetic waves via magnetic induction, typically from a speaker having a magnetic core, or magnetic induction transmitted by an induction loop, typically installed around the walls in theaters, classrooms, churches and the like. However, even if hearing aids are used by hearing impaired persons, many portable electronic devices, particularly mobile phones of cellular networks such as GSM systems, IS54 systems and PDC systems, still remain barely accessible due to radio interference and magnetic noise coupling between mobile phones and hearing aids having magnetic pickup coils.

Recent attempts to assist hearing impaired persons using mobile phones include a new product such as Nokia Wireless Loopset (manufactured by the Assignee), which is an electronic accessory utilizing induction loop built in standard hearing aids to minimize radio interference. In addition to the hearing aid, the Wireless Loopset must be worn around the neck of a hearing impaired person like a necklace or around the body like a belt. Separate wires must be required to form an induction loop and to establish connection with a mobile phone, via an activator unit. However, the Wireless Loopset can be cumbersome for everyday usage. Moreover, there are plenty of situations where hearing impaired persons do not desire to wear an electronic accessory such as the Wireless Loopset as a visible part of clothing.

Therefore, a need exists for smart clothing which incorporates the essence of Nokia Wireless Loopset into a garment for allowing hearing impaired persons to conveniently use portable electronic devices such as mobile phones and similar electronic devices. More specifically, there is a need for garments having Wireless Loopsets integrated therein for enabling persons with hearing devices such as hearing aids, headsets and hands-free arrangements to conveniently and comfortably use portable electronic devices such as mobile phones more efficiently with reduced radio interference.

SUMMARY OF THE INVENTION

Accordingly, one aspect of the present invention is directed to an article of functional clothing having a wireless loopset incorporated therein for enabling persons with hearing devices to conveniently use at least one portable electronic device such as a mobile phone efficiently with reduced radio interference. One or more electrically conductive fibers are integrated or sewed into a garment such as a jacket, a vest, a shirt or a pant in a predetermined pattern to form an induction loop. An activator unit is then arranged at a predetermined location on the induction loop to establish electrical connection and thus activate the induction loop, and to provide an interface to at least one portable electronic device.

In an embodiment of the present invention, the electrically conductive fibers may contain a metallic material, a semi-metallic material, a semi-insulative material, a semi-conductive material, a transparent conductive material, pieces of metal showered to the fiber or any other fiber material that provides sufficient current to create an electromagnetic field. More specifically, each conductive fiber may consist of a central metallic core composed of an electrically conductive material, and an insulative overcoat composed of an insulative material. The electrically conductive material may contain one of a metallic material, a semi-metallic material, a semi-insulative material, a semi-conductive material, a transparent conductive material and any other fiber material that provides sufficient current to induce induction coupling between the garment and a hearing device.

In another embodiment of the present invention, the activator unit may contain a power source; a microphone; required processor electronics, and one or more interfaces which provide appropriate connection to close the induction loop and to the portable electronic device, via either a transmission wire/fiber or wireless transmission. Such an activator unit may also include a fastening device, such as a metallic button, a pin, a snap, a hook, and a zipper with conductive teeth for data/power connection, arranged to close the induction loop.

In accordance with another aspect of the invention, there is provided a process of fabricating smart clothing. Electronically conductive fibers are integrated into a garment in a certain pattern to form an induction loop. An activator unit is formed at a certain location on the induction loop to establish electrical connection and activate the induction loop, and to provide an interface to at least one portable electronic device.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAIL DESCRIPTION OF EMBODIMENTS OF THE INVENTION

The present invention discloses smart clothing and more specifically, a garment such as a jacket, a vest, a shirt or a pant having a wireless loopset integrated therein, via electrically conductive fibers for radiating an electromagnetic field for inductive coupling or capable of a wired or wireless interface. Clothing fabricated with the wireless loopset allows persons with hearing devices such as hearing aids, headsets and hands-free arrangements to achieve greater functionality, including allowing the user to better listen and communicate with others, via mobile devices, with reduced to minimal or no radio interference. Such a garment is applicable for use with various types of portable electronic devices, mobile devices, hearing devices, and cellular and radio networks, including wireless local area networks, Bluetooth networks and Wideband networks. However, for the sake of simplicity, discussions will concentrate mainly on the integration of hearing aids and mobile devices into garments known as smart clothing.

Figure 1:
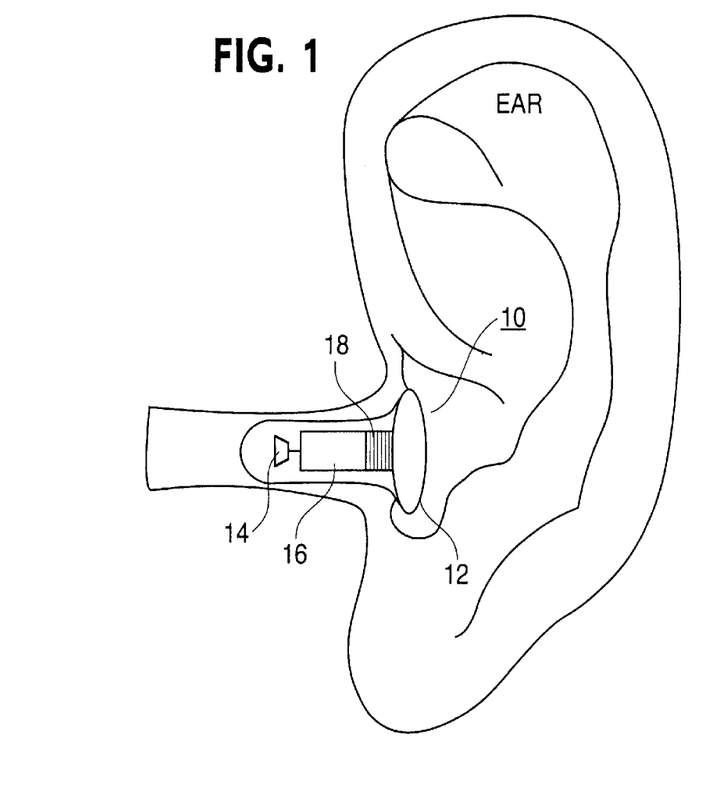
FIG. 1 illustrates an example hearing aid for hearing impaired persons.

Attention now is directed to the drawings and particularly to FIG. 1, an example hearing aid for hearing impaired persons to use as an earpiece is illustrated. As shown in FIG. 1, the example hearing aid 10 comprises an earpiece microphone 12, a speaker 14, associated processor electronics 16, an inductive coil 18 arranged to conventionally convert acoustic waves into electrical representations for amplification and subsequent conversion back into acoustic waves by the earpiece speaker 14 to better aid hearing impaired persons. With the more advanced functionality, the hearing aid 10 is arranged to inductively couple to an example Nokia Wireless Loopset 20 shown in FIG. 2 by the inductive coil 18 hereinbelow.

Figure 2:
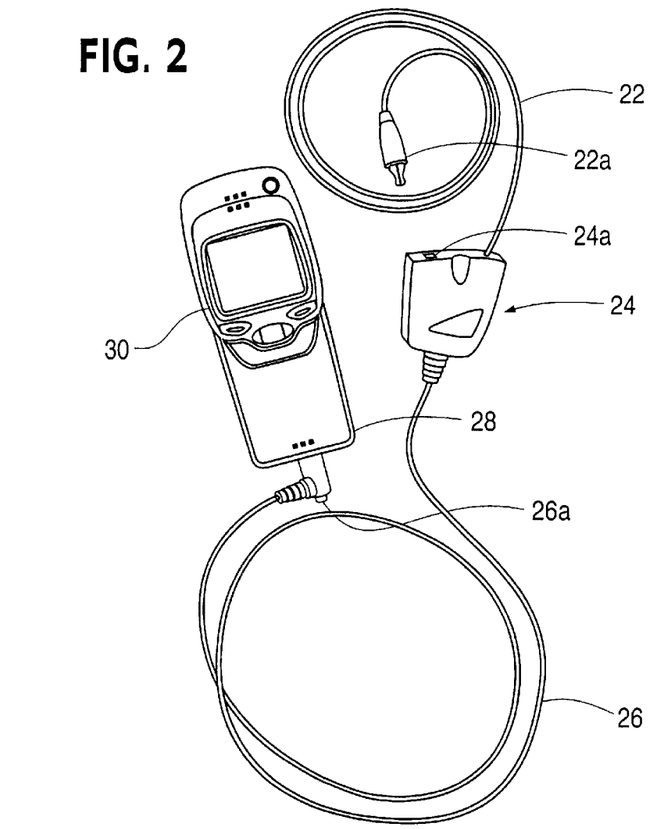
FIG. 2 illustrates an example Nokia Wireless Loopset for use in conjunction with an example hearing aid shown in FIG. 1.

FIG. 2 illustrates the example Nokia Wireless Loopset 20 for use in conjunction with the example hearing aid 10 shown in FIG. 1. The Nokia Wireless Loopset 20 comprises an inductive wire 22 having a connector 22a at a distal end, an activator unit 24 having a receptacle 24a which receives the connector 22a of the inductive wire 22 to form an induction loop, a wire 26 extending from the activator unit 24 and having a connector 26a at a distal end which connects to a portable electronic device such as a mobile phone 30.

A publication EP 0 789 474 A2 discloses a hands-free arrangement for mobile communication device which has similar function as the combination of Nokia Wireless Loopset 20 and Hearing aid 10 as described with reference to FIG. 2. In the publication, an earphone is operating to receive and couple inductively to the induction loop, which is connected to a mobile phone. Therefore, the hands-free arrangement enables user to use the mobile phone hands free. The hearing aid 10 is able to operate similarly when comprising the inductive loop, having of course the function of ordinary hearing aid.

The Nokia Wireless Loopset 20 represents an electronic accessory utilizing an induction loop built in a standard hearing aid shown in FIG. 1 so as to reduce radio interference. However, such a Wireless Loopset 20 must always be worn around the neck of a user like a necklace or around the body like a belt. The user must remember to carry the Wireless Loopset 20 for everyday usage. In addition, wires 22 and 26 must be required to form an induction loop and to establish connection with a mobile phone 30, via an activator unit 24. As a result, the Wireless Loopset 20 can be cumbersome for everyday usage. Further, there are situations where hearing impaired persons do not desire to wear an electronic accessory such as the Wireless Loopset 20 as a visible part of their clothing.

Figure 3:
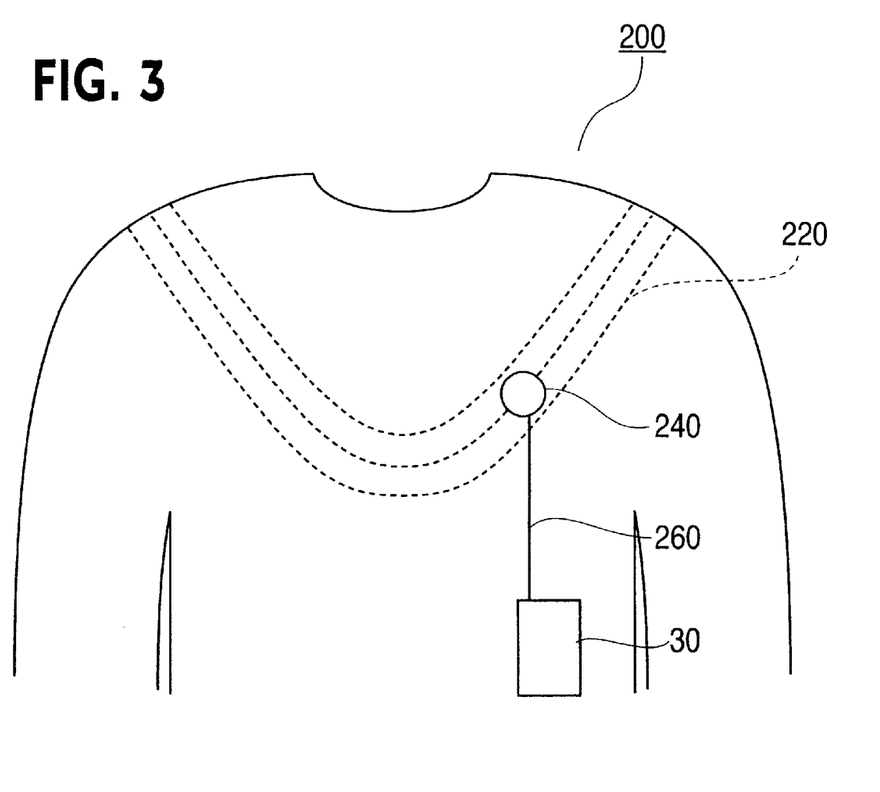
FIG. 3 illustrates an example garment having an example wireless loopset integrated therein according to an embodiment of the present invention.

Turning now to FIG. 3, an example garment 200 having an example wireless loopset integrated therein according to an embodiment of the present invention is illustrated. Such a garment 200 is known as "smart clothing" because a wireless loopset is incorporated to allow persons with hearing aids to achieve greater functionality, such as allowing the user to better listen and communicate with others, via mobile devices, with reduced to minimal or no radio interference. As shown in FIG. 3, the garment 200 may be a jacket, a vest or a shirt that is fabricated using electrically conductive fibers 220 to form an induction loop around, for example, the collar of the garment 200 for radiating an electromagnetic field for inductive coupling or capable of a wired or wireless interface. The garment 200 also comprises an activator unit 240 arranged to close and thus activate the induction loop as well as providing an interface to the mobile phone 30. Such an interface may be wired, via a fiber or a wire 260, or wireless in compliance with Bluetooth.

One or more conductive fibers 220 are sewed, either by hand or sewing machine, into the garment 200 to form a complete induction loop. Conductive fibers 220 may be metallic fibers having insulative coating or non-metallic fibers such as carbon, plastic or optical fibers. Optical fibers may be advantageous since they are prone to corrosion and wear and can withstand repeated washing and detergents commonly found in washing machines and driers. If optical fibers are utilized to form an induction loop, such optical fibers are used to convey data information between the activator unit 240 and the mobile phone 30. In a more particular embodiment, however, the conductive fibers 220 are laminated by other textile fibers for added protection from normal wear and tear. In addition, the conductive fibers 220 exhibit a diameter of approximately 0.5 to 1 mm, and the garment 200 exhibit a diameter of approximately 2.2 mm. Also, advantageously for inexpensive manufacturing process, one or more conductive fibers 200 may also be composed by showering pieces of metal among non-conductive fibers.

In a more particular embodiment of the present invention, the activator unit 240 is a piece of jewelry, which is hooked to the garment 200 to enable the user to use the wireless loopset. Alternatively, the activator unit 240 is a fastening device arranged to close the induction loop. Examples of such a fastening device include, but not limited to, a metallic button with set order (2 connections for voice out and 2 connections for voice in), a pin, a snap, a hook, a zipper with conductive teeth for data/power connection or even a Velcro™. In addition, standard plugs and other "traditional" computer/electronic industry data connectors may also be used to connect the conductive fibers 220 and thereby close the induction loop (for example, when a jacket is closed the induction loop is closed OR when the activator unit is inserted into the garment, the induction loop is also closed at the same time). A button or a zipper is advantageous if an order of connectivity is desired since both are connected in a known fashion.

Figure 4:
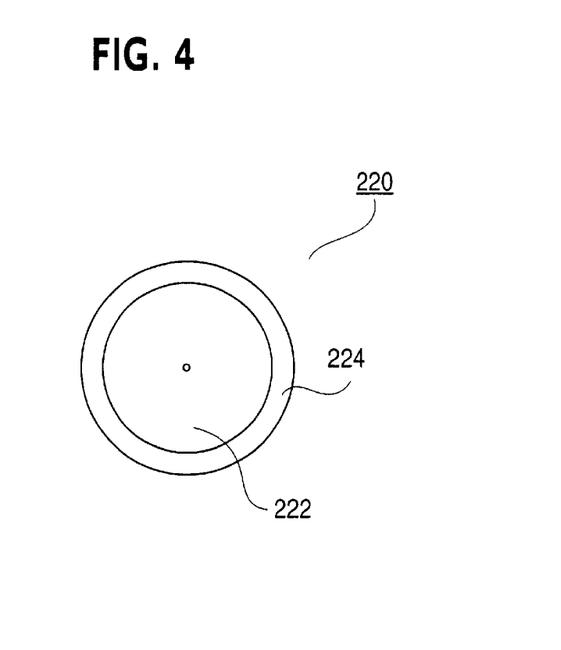
FIG. 4 illustrates a cross-sectional diagram of an example inductive loop fiber according to an embodiment of the present invention.

FIG. 4 illustrates a cross-sectional diagram of an example conductive fiber 220 according to an embodiment of the present invention. Referring now to FIG. 4, a single electrically conductive fiber 220 includes a central metallic core 220 and an insulative overcoating layer 224. Central metallic core 222 composes of an electrically conductive material, which includes a metallic material, a semi-metallic material, a semi-insulative material, a semi-conductive material, a transparent conductive material and any other fiber material that provides sufficient current to induce induction coupling between the garment 200 and a hearing device such as a hearing aid 10, and wired connection between the garment 200 and a portable electronic device such as a mobile phone 30.

Insulative overcoating 224 composes of an insulative material, such as KELVAR, as commonly used in the fiber optic industry, a plastic material, such as any organic polymer based material, for example PMMA or polyimide, or some other similar insulative material. Insulative overcoating 224 serves to insulate central metallic core 222 from defining electrical connections where they are not desired. For example, the insulative overcoating 224 prevents electrical cross-talk, more specifically, signal crossings from individual conductive fibers 220. Alternatively, conductive fibers 220 are formed of a solid metallic fiber, or a fiber having a non-metallic core and a metallic overcoating.

Electrically conductive fibers 220 includes, a metallic material, a semi-metallic material, a semi-insulative material, a semi-conductive material, a transparent conductive material or any other fiber material that provides sufficient current to create an electromagnetic field. More particularly, metallic materials may include steel, iron, nickel, cobalt, copper, gold, chromium, molybdenum, tungsten, tin, zinc, manganese, thallium, aluminum, magnesium, and the like and mixtures thereof.

Semi-insulative materials includes gallium nitride (GaN), aluminum nitride (AlN), and the like. Semi-metallic and semi-conductive materials may include binary materials such as gallium arsenide (GaAs), aluminum phosphide (AlP), aluminum arsenide (AlAs), gallium phosphide (GaP), indium phosphide (InP), indium arsenide (InAs), gallium antimonide (GaSb), indium antimonide (InSb), zinc selenide (ZnSe), and the like. Ternary materials may include gallium arsenide phosphide (GaAsP), aluminum gallium arsenide (AlGaAs), gallium indium antimonide (GaInSb), aluminum gallium phosphide (AlGaP), gallium indium arsenide (GaInAs), indium arsenide antimonide (InAsSb), and the like. Transparent conductive materials includes transparent metals such as indium oxide (InO), tin oxide (SnO), indium-tin-oxide (ITO), or the like.

Figure 5:
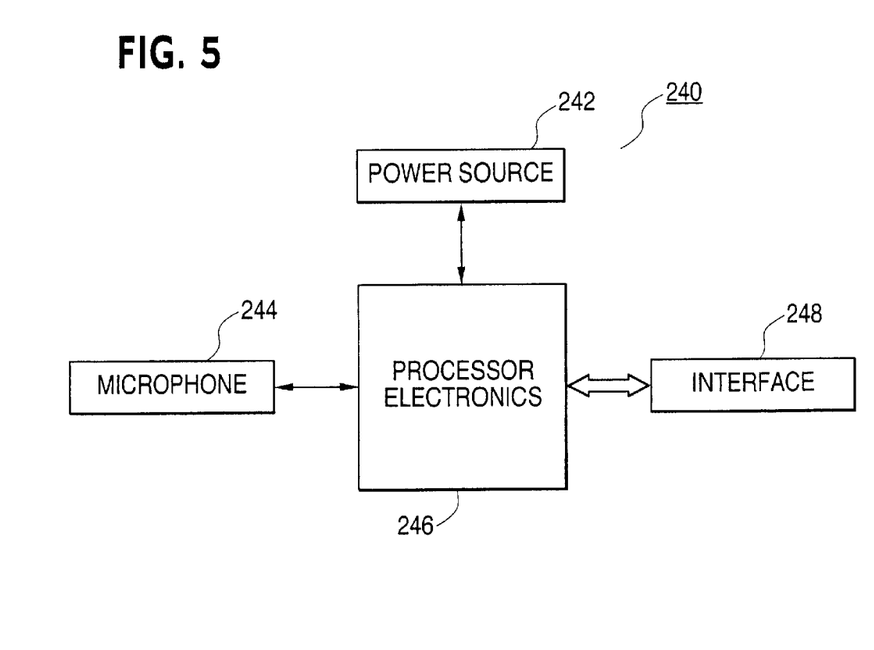
FIG. 5 illustrates an example activator unit according to an embodiment of the present invention.

FIG. 5 illustrates an example activator unit 240 according to an embodiment of the present invention. As previously described, such an activator unit 240 is a piece of jewelry, or a fastening device, such as a metallic button, a pin, a snap, a hook, and a zipper with conductive teeth arranged to close the induction loop. As shown in FIG. 5, the activator unit 240 includes a power source 242, a microphone 246, required processor electronics 246, and one or more interfaces 248 which provide appropriate connections to close the induction loop and to the mobile phone 30, via either a transmission wire/fiber or wireless via Bluetooth.

Figure 6A:
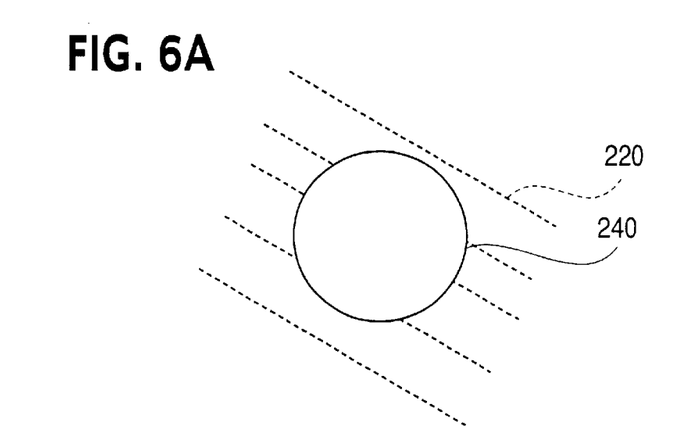
FIGS. 6A–6B illustrate an example connection between inductive loop fibers and an activator unit according to an embodiment of the present invention.
Figure 6B:
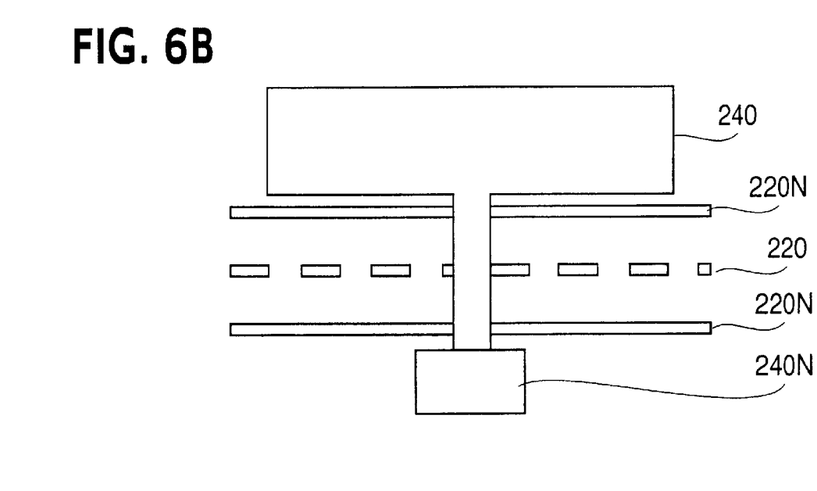

FIGS. 6A–6B illustrate an example connection between inductive loop fibers 220 and an activator unit 240 in a garment 200 according to an embodiment of the present invention. If the garment 200 is a jacket, a vest or a shirt, the conductive fibers 220 are sewed around the collar of the garment 200. The activator unit 240 corresponds to a metallic button as shown in FIG. 6A which is inserted into a corresponding button hole to establish connections between the conductive fibers 220 so as to close the induction loop. FIG. 6B illustrates a side view of the activator unit 240 in a form of a metallic button inserted, via a button hole. The conductive fibers 220 are protected by insulation or non-conductive fibers, such as normal textile fibers 220N. A fastener 240N is utilized to secure the activator unit 240 in the button hole to close the induction loop.

Figure 7:
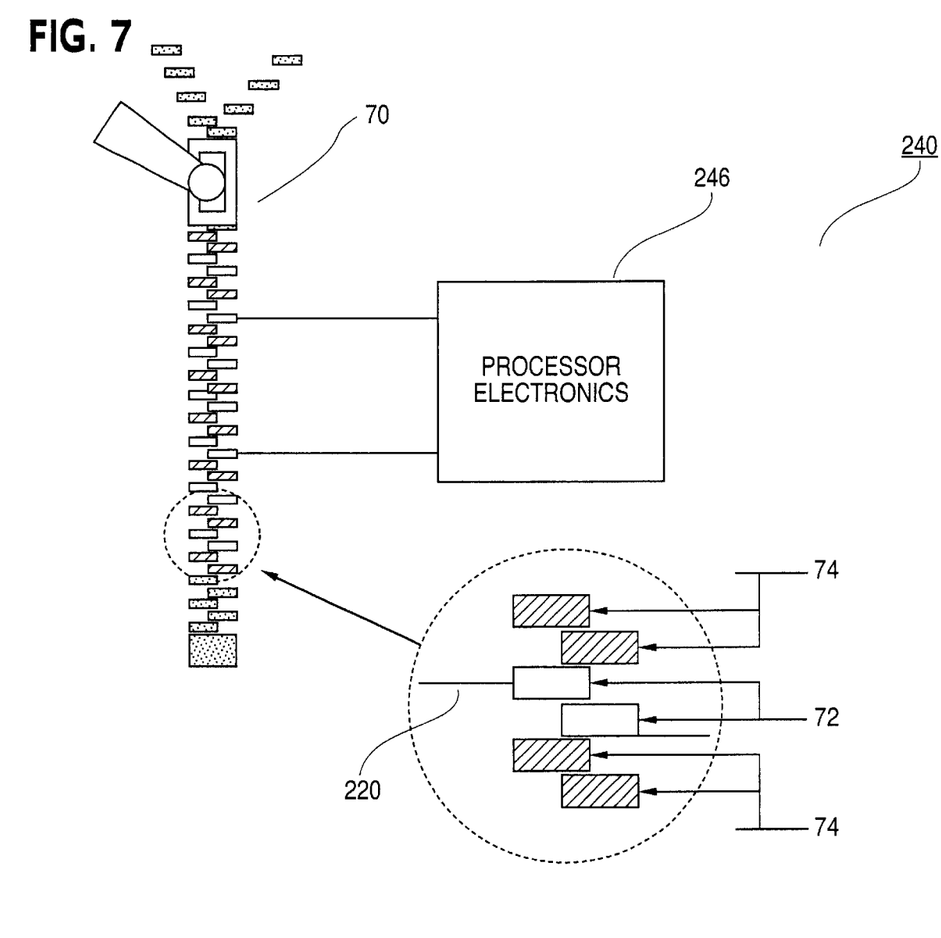
FIG. 7 illustrates another example connection between inductive loop fibers and an activator unit according to a more particular embodiment of the present invention.

FIG. 7 illustrates another example connection between inductive loop fibers 220 and an activator unit 240 in a garment 200 according to another embodiment of the present invention. As shown in FIG. 7, a zipper 70 with conductive teeth for data/electric connection is utilized to serve as an interface 248 of the activator unit 240 so as to establish connections between the conductive fibers 220 forming an induction loop. The zipper 70 includes a plurality of teeth where some are conductive teeth 72, some are insulative teeth 74, and some may be neither insulative teeth 74 nor conductive teeth 72. Both the conductive teeth 72 and the insulative teeth 74 are connected to conductive fibers 220 and non-conductive fabrics 220N of the garment 200 as described with reference to FIG. 6B. More specifically, the conductive fibers 220 which form an induction loop around the collar of the garment 200 are electrically connected to the conductive teeth 72 so as, when the zipper 70 is closed, the conductive teeth 72 close the induction loop for transferring data and information through the conductive fibers 220. Alternatively, the processor electronics 246 processes the data information or conducts the current, which flows in the conductive fibers 220. Such a zipper 70 is desirable if an order of connectivity is desired.

Figure 8A:
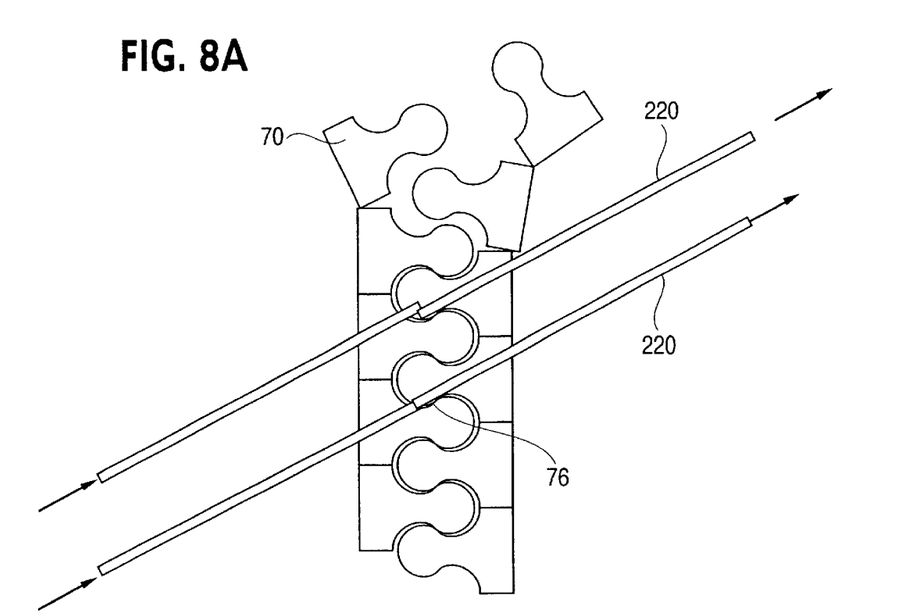
FIGS. 8A–8B illustrate example implementations of establishing connections between inductive loop fibers using a zipper according to a more particular embodiment of the present invention.
Figure 8B:
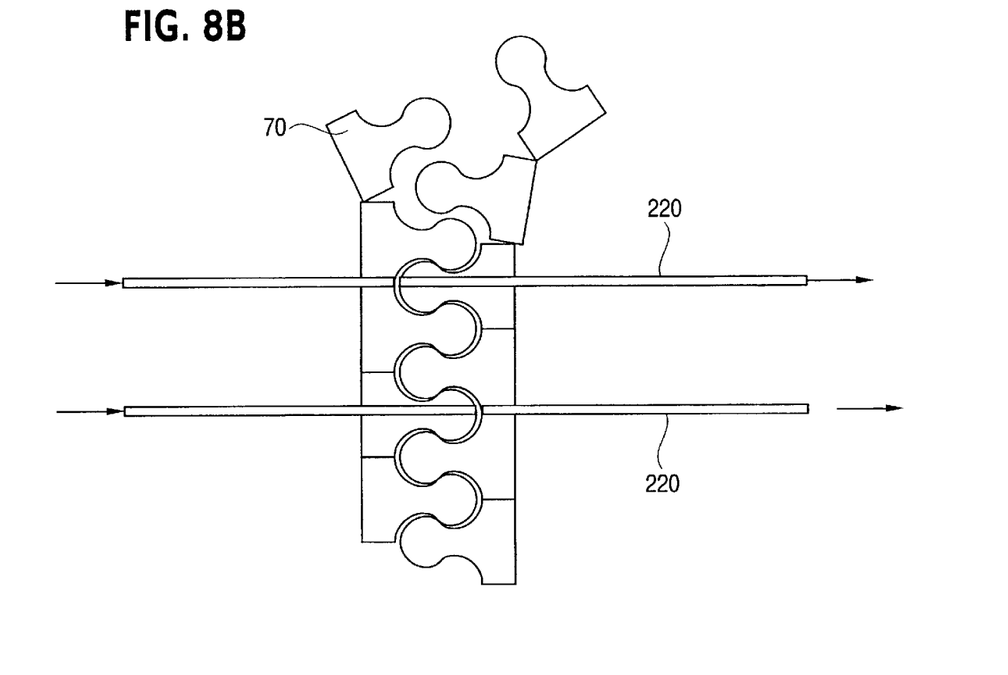

FIGS. 8A–8B illustrate example implementations of establishing connections between conductive fibers 220 using a zipper 70 according to an embodiment of the present invention. As shown in FIG. 8A, the conductive fibers 220 are manufactured in conductive teeth 72 of a zipper 70 whereby each tooth of the zipper 70 includes a flat surface 76 where pairs of teeth 72 may be connected. The conductive fibers 220 meet end-to-end to form an induction loop around the garment 200. In addition, as shown in FIG. 8B, all teeth in the zipper 70 are alike, possibly made out of a transparent material which allows the conductive fibers 220 to be connected end-to-end in a parallel fashion without direct contact but still maintain connectivity.

Figure 9:
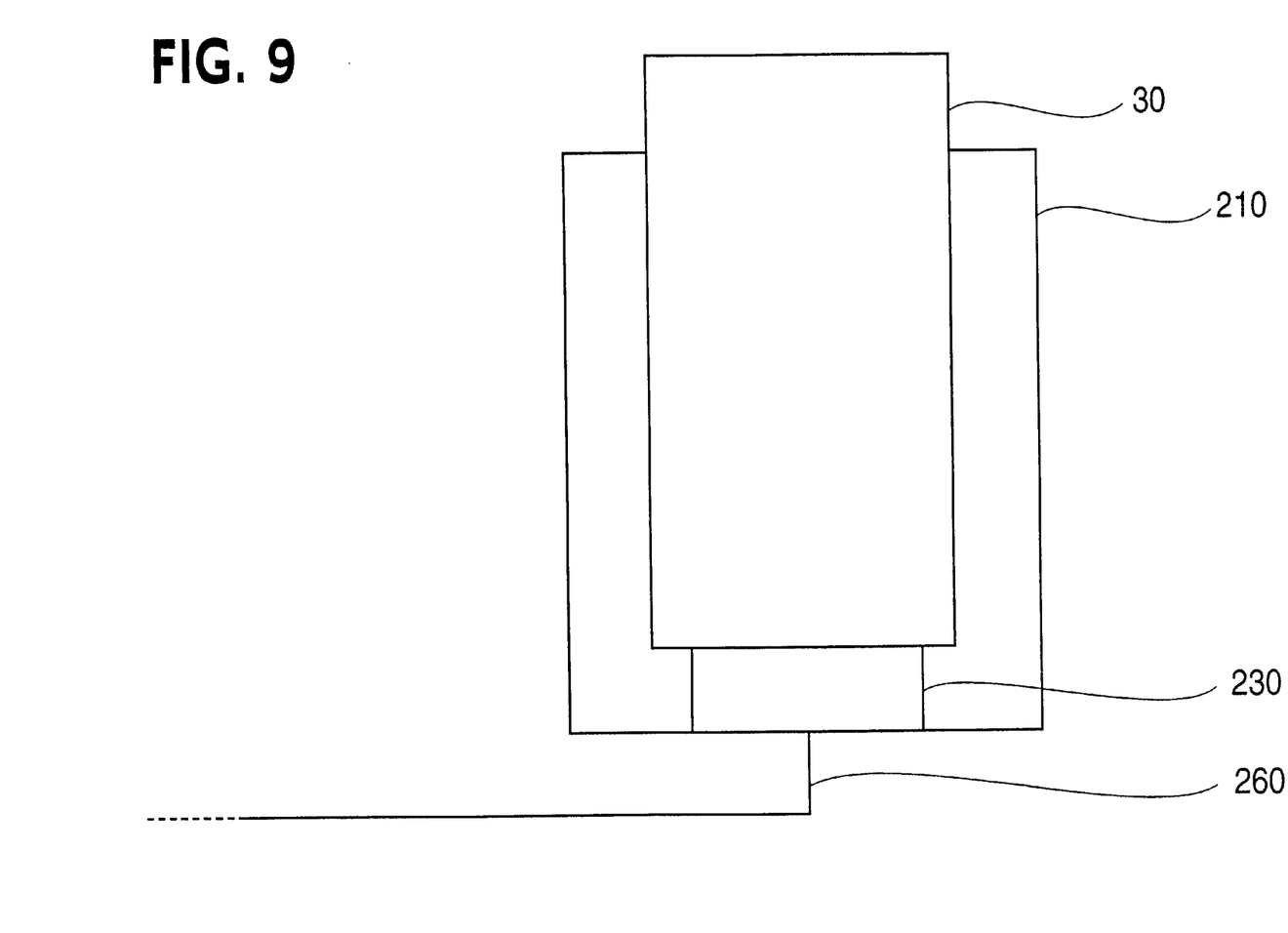
FIG. 9 illustrates an example connection between a garment and a mobile phone according to a more particular embodiment of the present invention.

FIG. 9 illustrates an example connection between a garment 200 and a mobile phone 30 according to an embodiment of the present invention. The garment 200 contains one or more pockets, and at least one pocket 210 is fabricated with the required fiber/wire connector 230 for establishing a connection between an activator unit 240 and a mobile phone 30. The pocket 210 which has the required fiber/wire connector 230 is permanently sewed into the garment 200. However, such a pocket 210 can also be removable from the garment 200 if separate connectors are used to connect to the garment 200 (actually one extra connector).

As described from the foregoing, the garment having a wireless loopset integrated therein using electrically conductive fibers for radiating an electromagnetic field for inductive coupling, or capable of a wired or wireless interface advantageously allows persons with hearing devices to achieve greater functionality, such as allowing the user to better listen and communicate with others, via mobile devices, with reduced or no radio interference.

While there have been illustrated and described what are considered to be preferred embodiments of the present invention, it will be understood by those skilled in the art that various changes and modifications may be made, and equivalents may be substituted for elements thereof without departing from the true scope of the present invention. For example, other types of fastening devices with conductive elements not described herein may be utilized to activate connections of conductive fibers in a garment and to provide information regarding the status of such connections to processor electronics (i.e., if the fastening device is fastened or unfastened). Depending on the status of the fastening device, portable electronic devices such as mobile phones, pagers, personal digital assistants (PDA), tape cassette players, compact-disc (CD) players, MD players, DAT players, televisions, radios, clock/alarms, or some other similar mobile devices, may be automatically activated or deactivated based on the position of the fastening device. The fastening device may also be part of a bus (standard bus). This way when the fastening device is fastened, individual signal lines which are part of the bus may be opened when the fastening device is unfastened, and closed when the fastening device is fastened. The garment may also include connectors that are connected to the wires that allow for attachment of various portable electronic devices and removal of portable electronic devices from the garment for cleaning purposes.

The invention may also be applied as a hands-free/headset arrangement for mobile communication device with or without the actual ordinary hearing aid, which is directed mainly for hearing impaired persons. In this case, the user has mobile phone accessories according to the invention enabling the information conducting between the phone, the loop and the earphone device.

Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An article of functional clothing comprising:
   a garment;
   electrically conductive fibers integrated at a predetermined location on the garment in a predetermined pattern to form an induction loop; and
   an activator unit arranged at a predetermined location on the induction loop to close and thus activate the induction loop by connecting opposite ends of the induction loop, and to provide an interface to at least one portable electronic device.

2. The article of functional clothing as claimed in claim 1, wherein the garment corresponds to one of a jacket, a vest, a shirt and a pant.

3. The article of functional clothing as claimed in claim 1, wherein the electrically conductive fibers are sewed into the garment in the predetermined pattern to form the induction loop.

4. The article of functional clothing as claimed in claim 1, wherein the electrically conductive fibers correspond to conductive yarns which are either metallic coated yarns, yarns that incorporate non-conductive fibers with metallic fibers, or yarns that are showered with metallic fibers.

5. The article of functional clothing as claimed in claim 1, wherein the electrically conductive fibers each comprises a central metallic core composed of an electrically conductive material, and an insulative overcoat composed of an insulative material.

6. The article of functional clothing as claimed in claim 5, wherein the electrically conductive material contains one of a metallic material, a semi-metallic material, a semi-insulative material, a semi-conductive material, a transparent conductive material and any other fiber material that provides sufficient current to induce induction coupling between the garment and a hearing device.

7. The article of functional clothing as claimed in claim 1, wherein the electrically conductive fibers contain a metallic material, a semi-metallic material, a semi-insulative material, a semi-conductive material, a transparent conductive material or any other fiber material that provides sufficient current to create an electromagnetic field.

8. The article of functional clothing as claimed in claim 1, wherein the activator unit comprises a power source; a microphone; required processor electronics, and one or more interfaces which provide appropriate connection to close the induction loop and to the at least one portable electronic device, via either a wire/fiber transmission or a wireless transmission.

9. The article of functional clothing as claimed in claim 8, wherein the activator unit is a piece of jewelry, or a fastening device, such as a metallic button, a pin, a snap, a hook, and a zipper with conductive teeth for data/electric connection, arranged to close the induction loop.

10. The article of functional clothing as claimed in claim 1, wherein the garment includes a removable pocket which has required wire/fiber connectors utilized to establish connection between the activator unit and the at least one portable electronic device.

11. The article of functional clothing as claimed in claim 1, wherein the activator unit includes a zipper with conductive teeth for data/electric connection utilized to establish electrical connection between the conductive fibers forming the induction loop and to provide an interface to the at least one portable electronic device.

12. The article of functional clothing as claimed in claim 1, wherein the at least one portable electronic device includes a mobile phone, a pager, a personal digital assistant (PDA), a tape cassette player, a compact-disc (CD) player, a MD player, a DAT player, a mini-television set, a radio, a clock/alarm, or some other similar mobile devices.

13. A process of fabricating smart clothing, comprising:
integrating electrically conductive fibers into a garment in a predetermined pattern to form an induction loop;
forming an activator unit at a predetermined location on the induction loop; and
activating the induction loop, via the activator unit, by establishing connection between opposite ends of the induction loop, and providing an interface to at least one portable electronic device.

14. The process as claimed in claim 13, wherein the garment corresponds to one of a jacket, a vest, a shirt and a pant, and wherein the electrically conductive fibers are sewed into the garment in the predetermined pattern to form the induction loop.

15. The process as claimed in claim 13, wherein the electrically conductive fibers each comprises a central metallic core composed of an electrically conductive material, and an insulative overcoat composed of an insulative material.

16. The process as claimed in claim 13, wherein the electrically conductive material contains one of a metallic material, a semi-metallic material, a semi-insulative material, a semi-conductive material, a transparent conductive material, showered pieces of metallic material and any other fiber material that provides sufficient current to induce induction coupling between the garment and a hearing device.

17. The process as claimed in claim 13, wherein the electrically conductive fibers contain a metallic material, a semi-metallic material, a semi-insulative material, a semi-conductive material, a transparent conductive material, pieces of metal material or any other fiber material that provides sufficient current to create an electromagnetic field.

18. The process as claimed in claim 13, wherein the activator unit comprises a power source; a microphone; required processor electronics, and one or more interfaces which provide appropriate connection to close the induction loop and to the at least one portable electronic device, via either a wire/fiber transmission or a wireless transmission.

19. The process as claimed in claim 13, wherein the activator unit is a piece of jewelry, or a fastening device, such as a metallic button, a pin, a snap, a hook, and a zipper with conductive teeth for data/electric connection, arranged to close the induction loop.

20. The process as claimed in claim 13, wherein the garment includes a removable pocket which has required fiber/wire connectors utilized to establish connection between the activator unit and the at least one portable electronic device.

21. The process as claimed in claim 13, wherein the activator unit includes a zipper with conductive teeth for data/electric connection utilized to establish electrical connection between the conductive fibers forming the induction loop and to provide an interface to the at least one portable electronic device.

22. The process as claimed in claim 13, wherein the at least one portable electronic device includes a mobile phone, a pager, a personal digital assistant (PDA), a tape cassette player, a compact-disc (CD) player, a MD player, a DAT player, a mini-television set, a radio, a clock/alarm, or some other similar mobile devices.

23. An article of functional clothing comprising:
a garment having a conductive fiber integrated therein for forming an induction loop; and
an activator unit arranged to close the induction loop establishing electrical conduction between opposite ends of the induction loop, and to serve as an interface between the garment and at least one portable electronic device.

24. The article of functional clothing as claimed in claim 23, wherein the garment and the at least one portable electronic device are in electrical interface utilizing a wireless connection.

25. The article of functional clothing as claimed in claim 23, wherein the conductive fiber includes a central metallic core composed of a metallic material and an insulative overcoating composed of an insulative material.

26. The article of functional clothing as claimed in claim 25, wherein the metallic material includes at least one of copper, gold, steel, iron, nickel, cobalt, chromium, molybdenum, tungsten, tin, zinc, manganese, thallium, aluminum, and magnesium.

27. An apparatus, comprising:
An inductive coil for inductively coupling a hearing device to a garment having conductive fibers integrated therein for forming an induction loop;
A speaker for conveying a message from at least one portable electronic device to a user of the hearing device; and
An activator unit for activating the induction loop by establishing a connection between opposite ends of the induction loop, and for establishing a connection between the at least one portable electronic device and the induction loop.

28. The apparatus as claimed in claim 27, wherein the conductive fibers correspond to conductive yarns that are metallic coated yarns, yarns that incorporate non-conductive fibers with metallic fibers, or yarns that are showered with metallic fibers.

29. The apparatus as claimed in claim 27, wherein the conductive fibers each comprises a central metallic core composed of an electrically conductive material, and an insulative overcoat composed of an insulative material.

30. The apparatus as claimed in claim 29, wherein the electrically conductive material contains one of a metallic material, a semi-metallic material, a semi-insulative material, a semi-conductive material, a transparent conductive material and any other fiber material that provides sufficient current to induce induction coupling between the garment and a hearing device.

31. The apparatus as claimed in claim 27, wherein the activator unit includes a zipper with conductive teeth for data/electric connection utilized to establish electrical connection between the conductive fibers forming the induction loop and to provide an interface to the at least one portable electronic device.

* * * * *